(12) United States Patent  
Landrot

(10) Patent No.: US 6,338,300 B1  
(45) Date of Patent: Jan. 15, 2002

(54) BOGIE WITH COMPOSITE SIDE MEMBERS

(75) Inventor: Alain Landrot, Le Creusot (FR)

(73) Assignee: Alstom France SA, Paris (FR)

( * ) Notice: Subject to any disclaimer, the term of this patent is extended or adjusted under 35 U.S.C. 154(b) by 0 days.

(21) Appl. No.: 09/373,653

(22) Filed: Aug. 13, 1999

(30) Foreign Application Priority Data

Sep. 2, 1998 (FR) .......................................... 98 10981

(51) Int. Cl.⁷ .................................................. B61F 3/00
(52) U.S. Cl. .................................. 105/182.1; 105/190.2
(58) Field of Search .......................... 105/182.1, 190.2, 105/193

(56) References Cited

U.S. PATENT DOCUMENTS 4,648,326 A * 3/1987 Jackson .................... 105/182.1
5,632,208 A * 5/1997 Weber ...................... 105/182.1

FOREIGN PATENT DOCUMENTS

| | | |
|---|---|---|
| EP | 0 547 010 | 6/1993 |
| WO | WO 96/08402 | 3/1996 |

* cited by examiner

*Primary Examiner*—S. Joseph Morano
*Assistant Examiner*—Robert J. McCarry, Jr.
(74) *Attorney, Agent, or Firm*—Young & Thompson

(57) ABSTRACT

A bogie designed to be secured so that it rests on wheels and including at least two wheel axles, at least one side member extending from the axles to an at least approximately central part of the length of the bogie, and axle boxes in which the axles are mounted so that they can rotae. The side member includes at least one interchangeable elastic leaf constituting parametrizable primary suspension, made of composite material based on fibers embedded in a resin, and a region of each end of the side member is housed in a side-member sleeve resting on a respective axle box via at least one insert element.

7 Claims, 3 Drawing Sheets

BOGIE WITH COMPOSITE SIDE MEMBERS

BACKGROUND OF THE INVENTION

The invention relates to a bogie, particularly for a railway vehicle, intended to support a load such as the body of the vehicle or a power plant, resting on a number of wheels divided between axles.

Given the mass supported and the speed of travel, the forces due to accelerations, particularly during changes of direction, are high and this is why it is commonplace to produce bogies in the form of solid steel components or mechanical/welded structures. These components and these structures are heavy (generally between 1300 and 1900 kg) and rigid and have to be equipped with suspension and damping systems in order to safeguard the comfort of the passengers of the vehicle and absorb vibrations due to the unevennesses of the railway track on which the vehicle runs; this means that, given the permissible axle loads, the load which can be carried in the body is, of necessity, particularly restricted.

European Patent Application 0,031,008 discloses a railway vehicle bogie comprising chassis parts in the shape of an H made of composite material; these chassis parts do not allow either the effective absorption of the forces due to vertical and transverse accelerations of the moving parts, or the mounting of accessories or safety equipment such as an engine, a braking system or a control system, because in order to effectively withstand the dynamic stresses generated, they would have to have a large cross section and this would take a significant amount of composite material, increasing the cost of the bogies and posing technical problems with moulding; furthermore, with this design, it is difficult to obtain a chassis which has flexibility properties that are identical on each side of the longitudinal mid-plane of the bogie.

SUMMARY OF THE INVENTION

The object of the invention is to overcome these drawbacks and to create a bogie which has a structure such that the side members play an effective part in the vehicle suspension while at the same time retaining a simple geometry and an attractive cost improving the overall economic performance of the bogie.

To this end, the invention relates to a bogie designed to be secured so that it rests on wheels and comprising at least two wheel axles, at least one side member extending from the axles to an at least approximately central part of the length of the bogie, and axle boxes in which the axles are mounted so that they can rotate, the bogie being characterized in that the side member comprises at least one interchangeable elastic leaf constituting parametrizable primary suspension, made of composite material based on fibres embedded in a resin, and a region of each end of the side member is housed in a side-member sleeve resting on a respective axle box via at least one insert element.

For example and as a preference, the side member consists of a single leaf which, being elastic and interchangeable, constitutes parametrizable primary suspension and is made of composite material.

By virtue of these characteristics, the side member which, simultaneously, fulfils functions of supporting the vehicle between the axles, acting as primary suspension for the vehicle, damping vibrations between the axles and the vehicle, and providing the axles with lateral guidance, plays a part in lightening the bogie compared with conventional steel structures, and this makes it possible to increase the load carried in the vehicle. The flexibility of the composite material, for example based on glass, carbon or aramid fibres, embedded in an epoxy or some other resin, allows it to perform effective damping at the vibrational frequencies most often excited in a bogie. Furthermore, the geometry of the side member may be chosen to be such that this member is simple to manufacture. The insert piece, which can move longitudinally with respect to the side member sleeve and the axle box, makes it possible to absorb differences associated with the vehicle loading and to damp the bogie pitching phenomenon.

According to a preferred feature of the invention, the insert element is a damping means made at least partially of elastomer, for example of rubber, and preferably of elastomer-metal, which is stressed as a function of the elastic deformations of the elastic side member leaf and, together with the latter, makes it possible to damp the movements of the bogie.

According to another advantageous feature of the invention, the damping insert element constitutes an additional primary suspension stage for parametrizing the rigidity of the suspension.

According to another feature, as an alternative, the insert element is a component, for example made of metal, rubbing against a side friction block by way of damping element, and this makes it possible for a bogie to be fitted out at a more attractive cost when there is no need to optimize the effectiveness of the suspension.

According to yet another optional feature of the invention, the bogie has two side members each comprising at least one elastic leaf which is preferably monolithic, these leaves being connected to the one same bogie transom; it is possible to contrive for each side member to be connected to the transom underneath this transom at the upper part of the central region of the length of the leaf, and this allows this transom to support the vehicle while at the same time being equipped with secondary suspension means.

BRIEF DESCRIPTION OF THE DRAWINGS

Other features and advantages of the invention will emerge from the description which will follow of some embodiments of the invention which are given by way of non-limiting examples and illustrated by the appended drawings, in which.

DETAILED DESCRIPTION OF THE PREFERRED EMBODIMENTS

Figure 1:
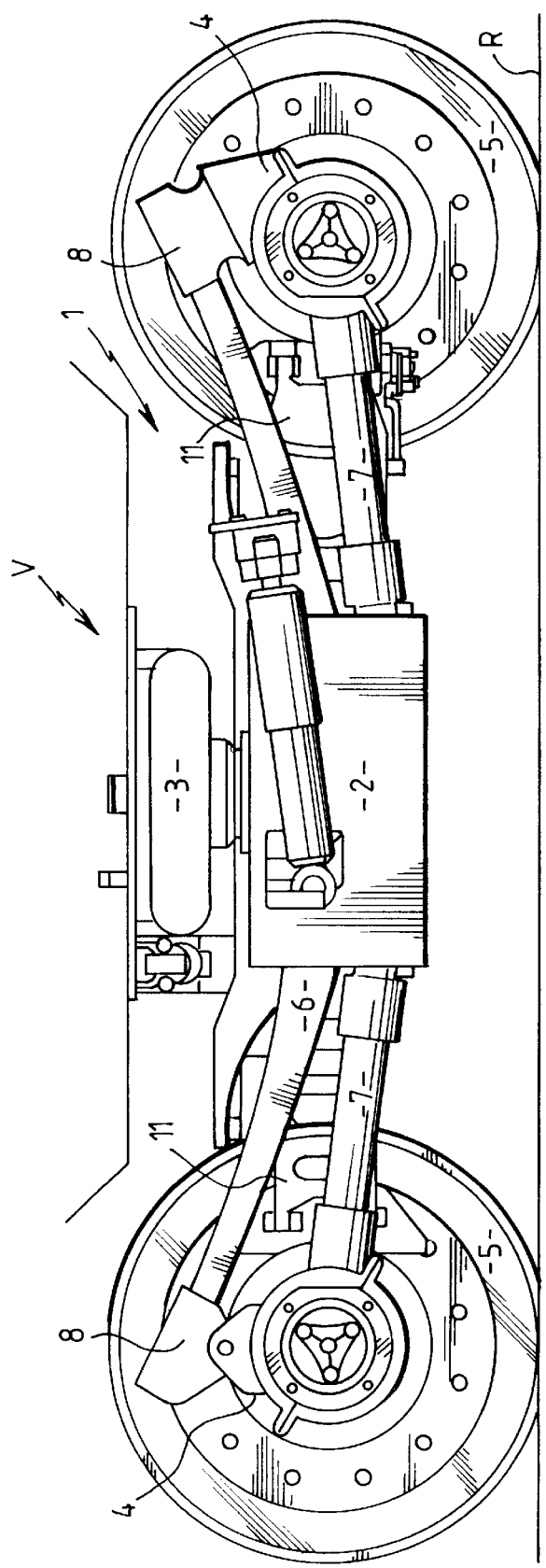
FIG. 1 is a diagrammatic side view of a bogie according to the invention.

The bogie 1 depicted in FIG. 1 is intended to support a railway vehicle V resting on rails R just one of which is visible in FIG. 1. This bogie 1 comprises a transom 2 on which there is arranged a secondary suspension assembly 3 inserted between the transom 2 and the body of the vehicle V. The transom 2 is supported in particular by axle boxes 4 for at least two axles which are mounted so that they can rotate therein, bearing wheels 5. For this purpose, two side members 6 (just one of which is visible in FIG. 1) are fixed to the transom 2 and connected to the axle boxes 4 in a way which will be described in greater detail later, so as to connect the axles to an at least approximately central region of the length of the bogie. The axle boxes 4 are also connected to the transom 2 by longitudinal arms 7.

Figure 3:
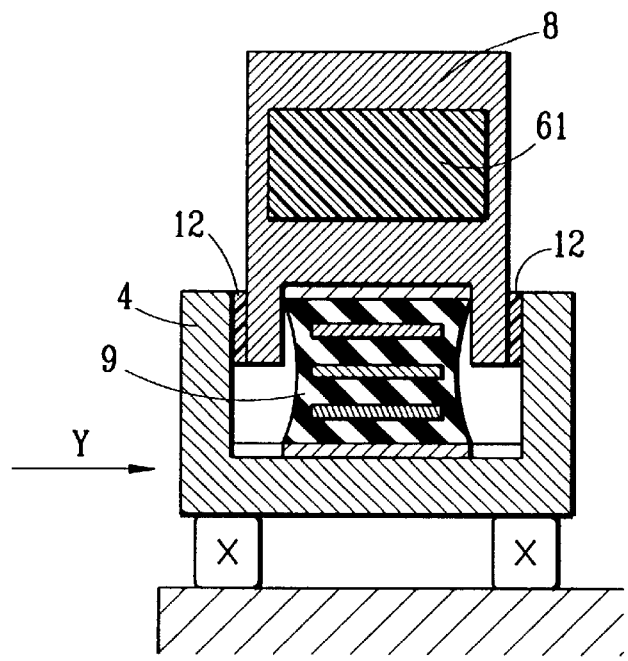
FIG. 3 is a diagrammatic section showing the mounting of a side member with respect to an axle box in a first embodiment of the invention.
Figure 4:
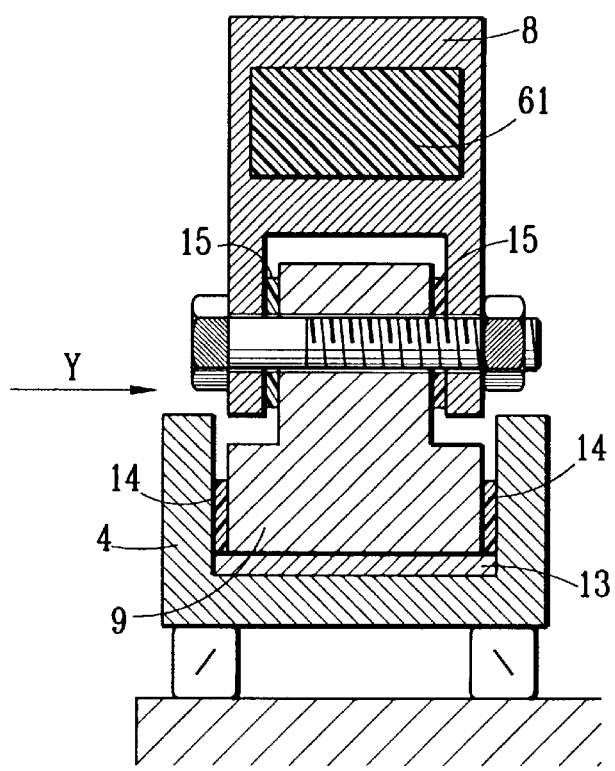
FIG. 4 is a diagrammatic section showing the mounting of a side member with respect to an axle box in a second embodiment of the invention.

The side members 6 each comprise at least one monolithic elastic leaf shaped appropriately, preferably bowed, made of glass, carbon or aramid fibres, embedded in a matrix based on epoxy or some other resin; thus, a lightweight structure which has excellent mechanical properties is obtained at a relatively low cost; a region 61 of each end of each side member 6 arranged with its central region at the bottom is housed in a side member sleeve 8 resting on a respective axle box 4 via at least one insert element 9 borne by the axle box and bearing the side member sleeve (FIGS. 3 and 4). In this particular instance, each side member 6 consists of a single elastic leaf made of composite material.

The regions 61 of the composite side member 6 are bonded into the sleeves 8 so as to produce an assembly capable of resting on the axle boxes 4. Assembling by bonding is particularly suited to a side member made of composite material, because the choice of adhesive is then made to suit this material.

The side members 6 may be fixed by any appropriate means, for example by U-bolts 10 (FIG. 2) into grooves in the transom 2 so that this transom and the side members 6 constitute a rigid assembly in the central part of the length of the bogie 1.

The side members 6 are modelled as bowed beams in this instance built into the grooves and held at the U-bolts 10, subjected to vertical forces at the bowed end regions 61; according to the invention, the flexibility of the leaves, which is due to the nature of the material chosen, is put to good use to make these leaves act as primary suspension as a result of their elastic deformation along their range of deflection; in this way, the side members play a significant part in achieving effective damping of any vibrations that occur between the axle boxes 4 and the transom 2, and this is achieved through an insert element, as will be seen later.

The choice of a fastening device that can be readily dismantled allows the side members 6 to be interchangeable so that these members constitute parametrizable primary suspension; furthermore, the side members may easily be paired in such a way that the chassis has identical flexibility characteristics on each side of the longitudinal mid-plane of the bogie; it is also easily possible to produce bogies of different lengths simply by choosing the length of the side members.

Figure 2:
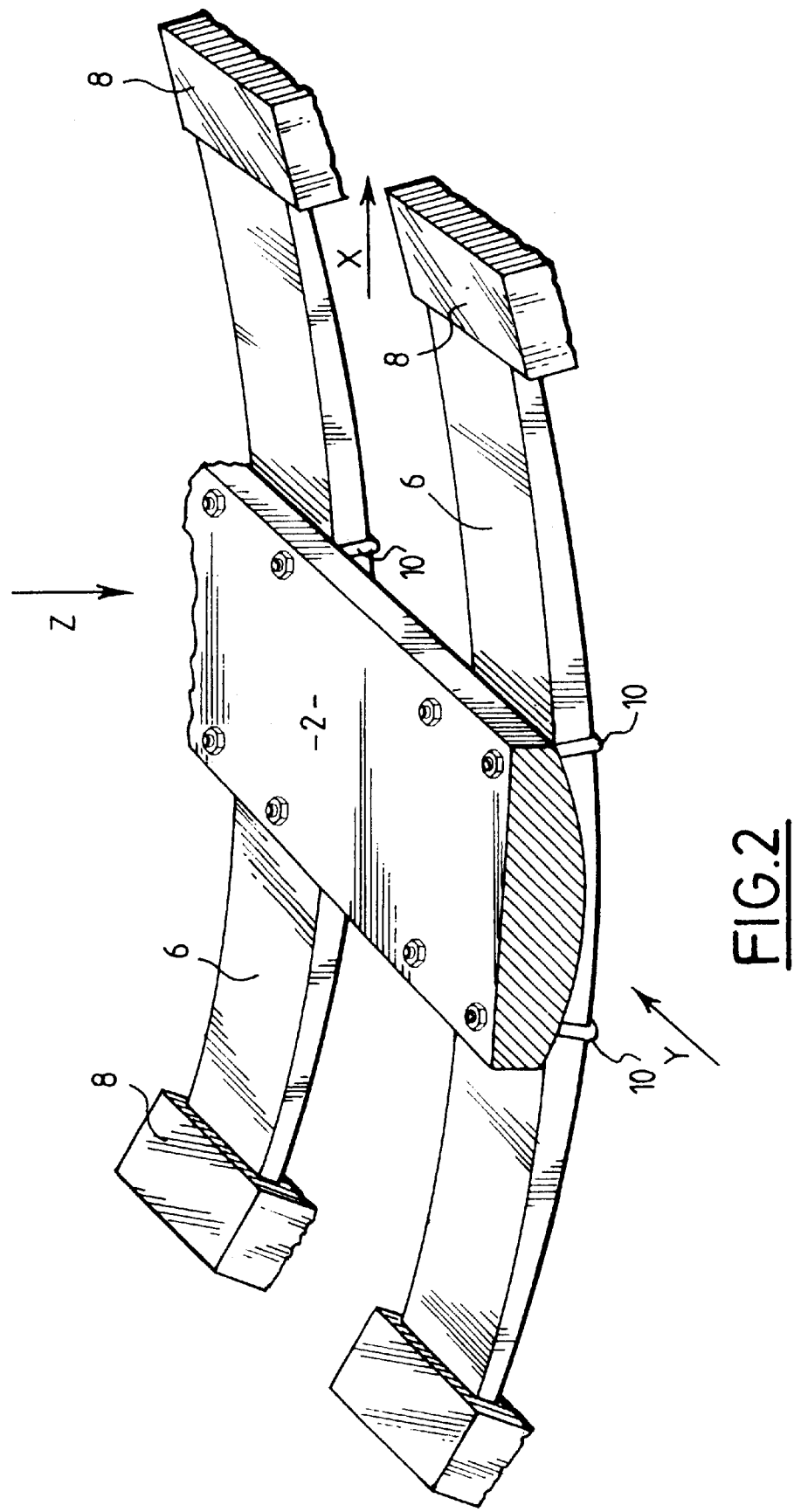
FIG. 2 is a diagrammatic perspective view of two side members and of part of a bogie transom belonging to a bogie like the one in FIG. 1.

By virtue of the bogie geometry, it is possible to fix auxiliary elements, such as a braking system 11 or an electronic control device, on the transom 2; in the case of a powered bogie, the transom 2 may support an engine for driving the wheels 5; the simple overall structure of the bogie according to the invention comprising a transom 2 and two side members 6 in accordance with the depiction in FIG. 2 makes it possible to achieve a particularly attractive cost price, especially for a bogie made partially of glass fibres and epoxy resin.

In the embodiments depicted in FIGS. 3 and 4 respectively, the elements which correspond to each other bear identical references.

As was seen earlier, the regions 61 of the ends of the composite side members 6 are each housed in a sleeve 8 borne by an axle box 4 via at least one insert element 9 which rests bearing on the axle box; furthermore, the axle boxes are connected to the bogie transom 2 by the arms 7, preferably also made of composite material, which can deflect freely under vertical forces (direction Z in FIG. 2).

In the two embodiments, the axle boxes 4 and the axles are mounted concentrically by means of rolling bearings, and the axle boxes have a part which, in section on a radial plane with respect to the wheels, has a U-shaped cross section, the branches of which U define between them a space in which the insert element 9 is at least partially housed. The sleeve 8 also has a U-shaped cross section, arranged the other way up compared with the U of the axle box, and the branches of which define between them a space in which the insert element 9 is partially housed; naturally, the U of the sleeve 8 has a web whose cross section is large enough in size that a region 61 of one end of the side member can be housed in a cavity formed therein.

In the embodiment of FIG. 3, the branches of the U of the sleeve 8 are housed between the branches of the U of the axle box 4, at such a distance therefrom that a small plate 12 made of self-lubricating polyamide with a low coefficient of friction, for example the material known under the trade name of Railco or the one known by the name of Ertalon can be fitted in between each branch of the U of the axle box and the closest branch facing it of the sleeve; in this embodiment, the insert element 9, which may be housed completely or almost completely in the volume that lies between the branches of the U of the axle box, is an elastomer (for example rubber) block or preferably a block made partially of elastomer and partially of some other material (for example metal) which damps the vibrations and deflections of the side member which are brought about by the movements of the bogie while the side member itself ensures that the position in the transverse direction (direction Y in FIGS. 2 to 4) is always correct. An appropriate choice of insert element which, in this embodiment, constitutes an additional primary suspension stage, as a function of its inherent rigidity, makes it possible to parametrize the vertical stiffness, that is to say the rigidity, of the suspension, and this gives the possibility of using this type of chassis with a powered bogie or unpowered bogie, high-speed or otherwise, with equal ease. The block 9 is preferably arranged between spacer pieces in contact, respectively, with the sleeve 8 and the axle box 4, and it can be seen that this block and these spacer pieces are neither fixed together nor fixed to the sleeve and/or axle box, it merely being possible for the amplitude of their movements to be limited by stops.

In the embodiment of FIG. 4, the exterior faces of the branch of the U of the sleeve 8 are also closer together than the interior faces of the branches of the U of the axle box 4, but the branches of the U of the sleeve in general are not, or are only to a small extent, inside the volume lying between the branches of the U of the axle box as a result of dimensional constraints due to the mounting of the insert element 9 rubbing on a metal side friction block 13 made, for example, of steel. In this embodiment, the insert element 9, itself for example a metal block, has the cross section of an inverted T, the horizontal branch of which is housed between the branches of the U of the axle box 4, at a distance such that a small plate 14 made of material with a low coefficient of friction can be fitted in between each branch of the U of the box 4 and the end face facing it of the horizontal branch of the inverted T of the block 9. Likewise, the vertical leg of the inverted T is housed between the branches of the U of the sleeve 8, at a distance such that a small plate 15 made of material with a low coefficient of friction can be fitted in between each branch of the U of the sleeve and the face facing it of this leg. The leg of the inverted T is connected to the branches of the inverted U of the sleeve by means of a pin forming a pivot passing right through the assembly (of course including the small plates 15).

I claim:

1. A bogie that rests on wheels and comprises:

at least two wheel axles;

axle boxes in which the axles are mounted for rotation; and at least one side member extending longitudinally from the axles to an approximate central part of said bogie, said at least one side member comprising at least one interchangeable elastic leaf, said at least one leaf being a primary suspension having physical parameters that can be modified at will, said at least one leaf being made of composite material based on fibres embedded in a resin and having an end region housed in a side member sleeve, said end region resting on an axle box via at least one insert element.

2. The bogie according to claim 1, wherein said at least one insert element is a damping means made at least partially of an elastomer that, together with said at least one leaf, damps the movements of the bogie.

3. The bogie according to claim 1, wherein said at least one insert element is an additional suspension stage damping means to change the physical parameters of the rigidity of the suspension at will.

4. The bogie according to claim 1, wherein said at least one insert element is a metal component rubbing against a side friction block as a damping element.

5. The bogie according to claim 1, further comprising two side members, each side member comprising at least one elastic leaf and being connected to a same bogie transom.

6. A bogie that rests on wheels and comprises:

at least two wheel axles;

axle boxes in which the axles are mounted for rotation; and at least one side member extending longitudinally from the axles to an approximate central part of said bogie, said at least one side member comprising at least one interchangeable elastic leaf, said at least one leaf being a primary suspension having physical parameters that can be modified at will, said at least one leaf being made of composite material based on fibres embedded in a resin, and an end region housed in a side member sleeve and resting on an axle box via at least one metal component, said at least one metal component rubbing against a side friction block as a damping element.

7. The bogie according to claim 6, further comprising:

two side members, each side member comprising at least one elastic leaf and being connected to a same bogie transom.

* * * * *